(12) United States Patent
Eucker

(10) Patent No.: US 9,089,114 B2
(45) Date of Patent: Jul. 28, 2015

(54) FISH RETAINING AND TRANSPORTING ASSEMBLIES AND METHODS OF USING THE SAME

(71) Applicant: Scott Eucker, Yorkville, IL (US)

(72) Inventor: Scott Eucker, Yorkville, IL (US)

(*) Notice: Subject to any disclaimer, the term of this patent is extended or adjusted under 35 U.S.C. 154(b) by 0 days.

(21) Appl. No.: 14/293,810

(22) Filed: Jun. 2, 2014

(65) Prior Publication Data

US 2014/0353345 A1 Dec. 4, 2014

Related U.S. Application Data

(60) Provisional application No. 61/830,389, filed on Jun. 3, 2013.

(51) Int. Cl.
*A01K 65/00* (2006.01)
*A45F 5/10* (2006.01)

(52) U.S. Cl.
CPC .. *A01K 65/00* (2013.01); *A45F 5/10* (2013.01)

(58) Field of Classification Search
CPC .................................................. A01K 65/00
USPC .................. 224/103; D22/134; 294/137–171
See application file for complete search history.

(56) References Cited

U.S. PATENT DOCUMENTS

| | | | | | |
|---|---|---|---|---|---|
| 317,212 | A | * | 5/1885 | Rubin | 294/150 |
| 827,855 | A | * | 8/1906 | Farmer | 224/103 |
| 2,427,715 | A | * | 9/1947 | Cooper | 224/103 |
| 2,455,766 | A | * | 12/1948 | Harvey | 224/103 |
| 2,473,348 | A | * | 6/1949 | Sharps | 224/103 |
| 2,539,496 | A | * | 1/1951 | Towey | 224/103 |
| 2,592,389 | A | * | 4/1952 | Budy | 224/103 |
| 3,302,837 | A | * | 2/1967 | Montgomery | 224/103 |
| 3,387,752 | A | * | 6/1968 | Martin et al. | 224/103 |
| 3,482,747 | A | * | 12/1969 | Jones | 224/103 |
| 4,090,651 | A | * | 5/1978 | Raquel | 224/103 |
| 4,960,231 | A | | 10/1990 | Popovich | |
| 5,203,480 | A | * | 4/1993 | Day et al. | 224/103 |
| 6,772,924 | B2 | | 8/2004 | Bennett | |
| 7,407,069 | B1 | | 8/2008 | Trafas | |
| 2009/0085365 | A1 | * | 4/2009 | Ehrhard | 294/158 |

* cited by examiner

*Primary Examiner* — Justin Larson
(74) *Attorney, Agent, or Firm* — McCarter & English, LLP

(57) ABSTRACT

The present disclosure provides advantageous fish retaining and transporting devices or assemblies (e.g., fish stringers), and related methods of use. More particularly, the present disclosure provides advantageous fish retaining and transporting devices or assemblies having a handle member (e.g., elongated member), and related methods of use. In exemplary embodiments, the present disclosure provides for a fish retaining and transporting assembly including an handle member (e.g., elongated member) extending from a first end to a second end, and a stringer member extending from a first terminal end to a second terminal end, the first terminal end of the stringer member mounted with respect to and proximal to the first end of the handle member and the second terminal end of the stringer member mounted with respect to and proximal to the second end of the handle member.

20 Claims, 3 Drawing Sheets

FISH RETAINING AND TRANSPORTING ASSEMBLIES AND METHODS OF USING THE SAME

CROSS-REFERENCE TO RELATED APPLICATIONS

This application claims the benefit of U.S. Provisional Application No. 61/830,389 filed Jun. 3, 2013, all of which is herein incorporated by reference in its entirety.

BACKGROUND

1. Technical Field

The present disclosure relates to fish retaining and transporting devices or assemblies (e.g., fish stringers) and related methods of use and, more particularly, to fish retaining and transporting devices or assemblies having a handle member (e.g., elongated member), and related methods of use.

2. Background Art

In general, fish retaining/transporting devices or assemblies (e.g., fish stringers, etc.) are known. Some exemplary fish retaining devices or assemblies are described and disclosed in U.S. Pat. Nos. 7,407,069; 6,772,924 and 4,960,231, the entire contents of each being hereby incorporated by reference in their entireties.

Conventional fish retaining and/or transporting assemblies can make it difficult and/or inconvenient to retain and/or transport fish. As such, a constant need exists to develop fish retaining and/or transporting devices or assemblies that are convenient, cost-effective and/or include improved features/structures.

Thus, an interest exists for improved fish retaining and/or transporting devices or assemblies, and related methods of use. These and other inefficiencies and opportunities for improvement are addressed and/or overcome by the assemblies, systems and methods of the present disclosure.

SUMMARY

The present disclosure provides advantageous fish retaining and transporting devices or assemblies (e.g., fish stringers), and related methods of use. More particularly, the present disclosure provides advantageous fish retaining and transporting devices or assemblies having a handle member or elongated member, and related methods of use.

In exemplary embodiments, the present disclosure provides for a fish retaining and transporting assembly including a handle member (e.g., an elongated member) extending from a first end to a second end, and a stringer member extending from a first terminal end to a second terminal end, the first terminal end of the stringer member mounted with respect to and proximal to the first end of the handle member and the second terminal end of the stringer member mounted with respect to and proximal to the second end of the handle member. In certain embodiments, the first terminal end of the stringer member is fixedly secured, mounted or attached with respect to and proximal to the first end of the handle member (e.g., elongated member), and the second terminal end of the stringer member is fixedly secured, attached or mounted with respect to and proximal to the second end of the handle member.

The present disclosure provides for a fish retaining and transporting assembly including a handle member extending from a first end to a second; a stringer member extending from a first terminal end to a second terminal end, the first terminal end of the stringer member mounted with respect to the first end of the handle member and the second terminal end of the stringer member mounted with respect to the second end of the handle member; and one or more fish retaining members mounted with respect to the stringer member.

The present disclosure also provides for a fish retaining and transporting assembly wherein the handle member is a substantially cylindrical elongated handle member. The present disclosure also provides for a fish retaining and transporting assembly wherein the handle member is fabricated from wood or plastic. The present disclosure also provides for a fish retaining and transporting assembly wherein the handle member includes at least one finger gripping recess, groove or structure.

The present disclosure also provides for a fish retaining and transporting assembly wherein the stringer member is a chain-based stringer member. The present disclosure also provides for a fish retaining and transporting assembly wherein the stringer member is a cable-based stringer member.

The present disclosure also provides for a fish retaining and transporting assembly wherein the one or more fish retaining members are configured and dimensioned to releasably retain fish. The present disclosure also provides for a fish retaining and transporting assembly wherein the one or more fish retaining members are fixedly mounted with respect to the stringer member. The present disclosure also provides for a fish retaining and transporting assembly wherein the one or more fish retaining members are movably or slidably mounted with respect to the stringer member so that each movably mounted fish retaining member can slide or move along the length of the stringer member.

The present disclosure also provides for a fish retaining and transporting assembly wherein the first terminal end of the stringer member is substantially fixedly mounted with respect to the first end of the handle member and the second terminal end of the stringer member is substantially fixedly mounted with respect to the second end of the handle member.

The present disclosure also provides for a fish retaining and transporting assembly wherein the first and second ends of the handle member each include a fastening member and a securing member, the respective fastening members and securing members configured and dimensioned to allow a portion of the stringer member proximal to the first terminal end to be mounted with respect to the first end of the handle member, and to allow a portion of the stringer member proximal to the second terminal end to be mounted with respect to the second end of the handle member. The present disclosure also provides for a fish retaining and transporting assembly wherein the fastening members are screw members and the securing members are washers.

The present disclosure also provides for a fish retaining and transporting assembly wherein the first and second ends of the handle member each include a fastening member, two securing members and a ferrule member positioned between the two securing members, the respective fastening members, securing members and ferrule members configured and dimensioned to allow a portion of the stringer member proximal to the first terminal end to be mounted with respect to the first end of the handle member, and to allow a portion of the stringer member proximal to the second terminal end to be mounted with respect to the second end of the handle member. The present disclosure also provides for a fish retaining and transporting assembly wherein the configuration and mounting of the stringer member with respect to the handle member via the ferrule members, securing members and fastening members allows the stringer member or handle member to rotate freely relative to one another.

The present disclosure also provides for a method for retaining and transporting fish including providing a handle member extending from a first end to a second; providing a stringer member extending from a first terminal end to a second terminal end; mounting the first terminal end of the stringer member with respect to the first end of the handle member; mounting the second terminal end of the stringer member with respect to the second end of the handle member; mounting one or more fish retaining members with respect to the stringer member; and mounting a fish to one of the fish retaining members.

Any combination or permutation of embodiments is envisioned. Additional advantageous features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various steps, features and combinations of steps/features described below and illustrated in the figures can be arranged and organized differently to result in embodiments which are still within the spirit and scope of the present disclosure. To assist those of ordinary skill in the art in making and using the disclosed systems, assemblies and methods, reference is made to the appended figures, wherein.

DETAILED DESCRIPTION

Figure 1:
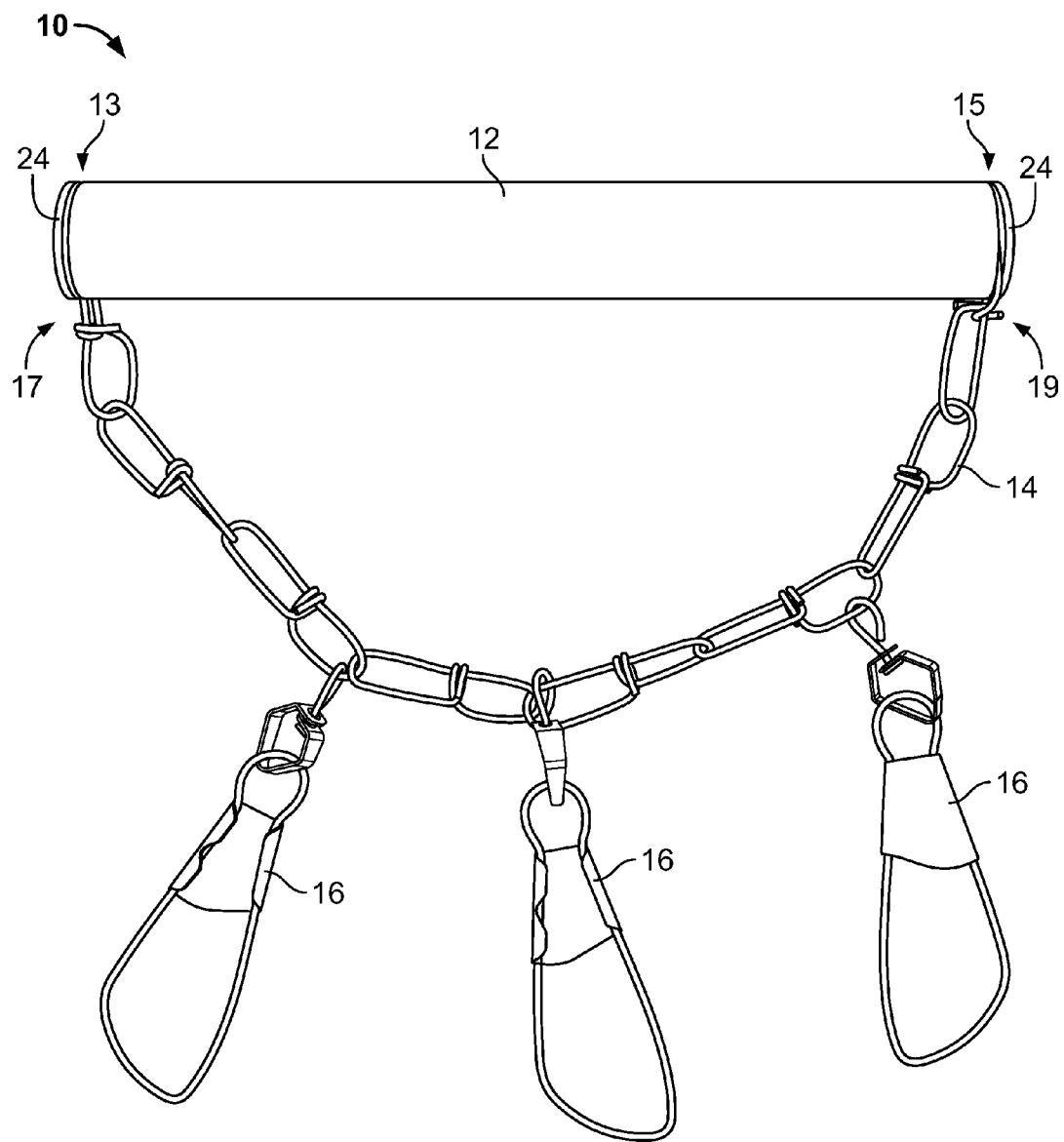
FIG. 1 is a front view of an exemplary fish retaining and transporting assembly according to the present disclosure.

The exemplary embodiments disclosed herein are illustrative of advantageous fish retaining and transporting devices or assemblies (e.g., fish stringers), and systems of the present disclosure and methods/techniques thereof. It should be understood, however, that the disclosed embodiments are merely exemplary of the present disclosure, which may be embodied in various forms. Therefore, details disclosed herein with reference to exemplary fish retaining and transporting assemblies/fabrication methods and associated processes/techniques of assembly and use are not to be interpreted as limiting, but merely as the basis for teaching one skilled in the art how to make and use the advantageous fish retaining and transporting assemblies/systems and/or alternative fish retaining/transporting assemblies of the present disclosure.

The present disclosure provides improved fish retaining and transporting devices or assemblies (e.g., fish stringers), and related methods of use. More particularly, the present disclosure provides improved fish retaining and transporting devices or assemblies having a handle member (e.g., elongated member), and related methods of use.

In exemplary embodiments, the present disclosure provides for a fish retaining and transporting assembly including a handle member extending from a first end to a second end, and a stringer member extending from a first terminal end to a second terminal end, the first terminal end of the stringer member mounted with respect to and proximal to the first end of the handle member and the second terminal end of the stringer member mounted with respect to and proximal to the second end of the handle member. In certain embodiments, the handle member is an elongated member.

Current practice provides that conventional fish retaining and/or transporting assemblies can make it difficult and/or inconvenient to retain and/or transport fish. Inconvenient and/or difficult to use fish retaining/transporting assemblies are not only frustrating for users (e.g., fishermen), but can lead to loss or partial loss of previously retained fish. For example, if a fish retaining/transporting assembly is inconvenient and/or difficult to use, then such assembly may cause previously retained fish to be lost or released from the assembly while the assembly is in use as a retaining device and/or while the assembly is being transported from the fishing location to some other location (e.g., while the fisherman is wading/fishing, while the user is transporting the retained fish from the fishing spot (river bank, boat, etc.) to another destination/location (cleaning table, car, cooler, etc.)).

In exemplary embodiments, the present disclosure provides for improved fish retaining and transporting devices/assemblies having a convenient and easy-to-use handle member (e.g., elongated member), and related methods of use, thereby providing a significant operational, commercial and/or manufacturing advantage as a result. By providing such advantageous fish retaining/transporting assemblies having a handle/elongated member, users can quickly and easily retain and transport their fish efficiently (e.g., from the river bank or boat to the cleaning table or car or some other destination), as well as have comfort knowing that such improved retaining/transporting assemblies will substantially eliminate the loss of retained fish from the assemblies during retention/transport.

As such, the improved fish retaining/transporting assemblies of the present disclosure make it easier for a user to retain and transport their fish, as the fish retaining/transporting assemblies include a user-friendly handle member (e.g., elongated handle member). For example, the utilization of such a user-friendly handle/elongated member allows a fisherman to transport the retained fish while the fisherman grasps the handle/elongated member, and while allowing the fish to stay retained on the stringer member and/or retaining devices of the assembly. Such use is highly advantageous when transporting retained fish in difficult conditions, such as, for example: (i) transporting retained fish from a wading fishing location in a body of water (e.g., flowing river, moving tidal water, etc.) to another destination (e.g., to shore, to a cleaning table, boat or camp, etc.) while the user and/or assembly are still in the water by grasping onto the handle/elongated member while allowing the fish to stay retained on the stringer member of the assembly, and (ii) transporting retained fish from a fishing location to another location while the user and/or assembly are out of the water and the assembly is lifted above or moved along or proximal to the surface of the ground or water by grasping onto the handle/elongated member while allowing the fish to stay retained on the stringer member of the assembly.

Referring now to the drawings, like parts are marked throughout the specification and drawings with the same reference numerals, respectively. Drawing figures are not necessarily to scale and in certain views, parts may have been exaggerated for purposes of clarity.

Figure 2:
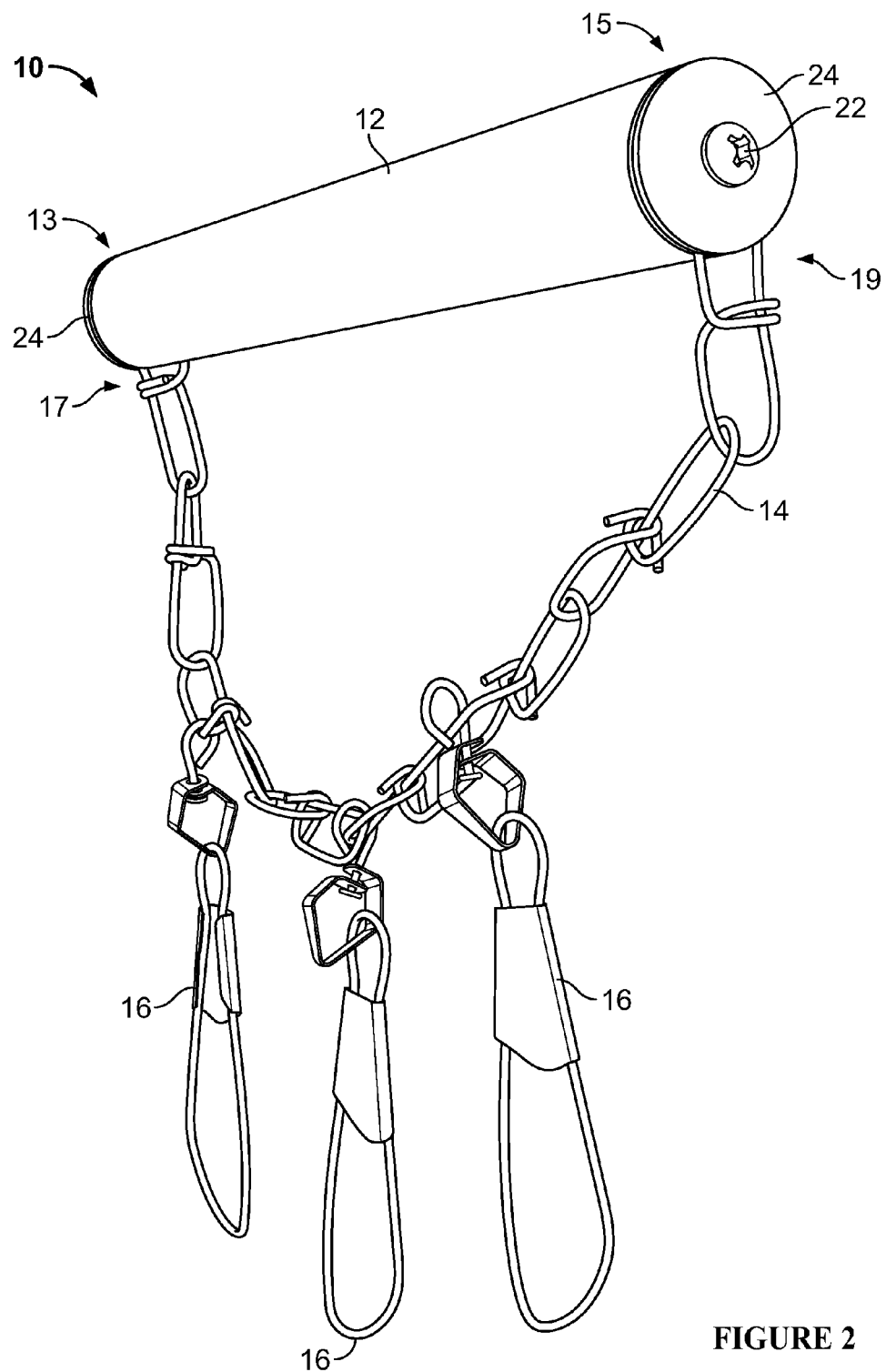
FIG. 2 is a side perspective view of the fish retaining/transporting assembly of FIG. 1.

With reference to FIGS. 1-2, there is illustrated an exemplary embodiment of a fish retaining and transporting assembly 10 according to the present disclosure. In general, fish retaining and transporting assembly 10 is configured and dimensioned to retain and/or transport fish or the like (e.g., during recreational or commercial fishing activities).

As shown in FIGS. 1-2, fish retaining/transporting assembly 10 typically includes a handle member 12 and a stringer member 14 that includes one or more retaining members or devices 16. Exemplary handle member 12 takes the form of an elongated handle member 12, although the present disclosure is not limited thereto. Rather, handle member 12 can take a variety of forms.

In certain embodiments, handle member 12 can be a wood-based handle member 12, although the present disclosure is not limited thereto. It is noted that handle member 12 can be fabricated from a variety of suitable materials (e.g., wood, metal, plastic, etc.). For example, handle member 12 can be a plastic-based handle member 12 (e.g., a high density polyethylene or HDPE rod or elongated member or the like). In exemplary embodiments, elongated handle member 12 extends about 8 inches in length.

As depicted in FIGS. 1-2, elongated handle member or rod 12 is substantially cylindrical and extends from a first end 13 to a second end 15. It is noted, however, that handle member 12 may take a variety of shapes/forms (e.g., substantially rectangular or polygonal in cross-sectional shape), and may include other features and/or structures (e.g., finger gripping recesses, grooves or structures 29, etc.—FIG. 3) for the user.

As noted and as shown in FIGS. 1-2, fish retaining/transporting assembly 10 typically includes a stringer member 14 that includes one or more retaining members or devices 16 coupled or attached thereto. In exemplary embodiments, stringer member 14 extends from a first terminal end 17 to a second terminal end 19.

As shown in FIGS. 1-2, exemplary stringer member 14 takes the form of a chain-based stringer member 14 having one or more fish retaining members or devices 16 (e.g., retaining clips/hooks or snap-on fasteners 16, etc.), although the present disclosure is not limited thereto and as further discussed below. It is noted that stringer member 14 can include any suitable number of fish retaining members 16 attached, secured or mounted with respect to member 14 (e.g., one member 16, three members 16, six members 16, nine members 16, etc.). Fish retaining members 16 are configured and dimensioned to releasably retain fish.

In general, each fish retaining member 16 is typically coupled, secured or mounted with respect to the stringer member 14. For example and as shown in FIGS. 1-2, one or more of the retaining members 16 may be substantially fixedly coupled to stringer member 14 (e.g., substantially fixedly coupled to a chain-link of chain-based stringer member 14), although the present disclosure is not limited thereto. Alternatively, one or more of the retaining members 16 may be movably coupled or mounted with respect to stringer member 14 (e.g., so that the movably coupled retaining members 16 can slide or move along the length of chain-based stringer member 14).

Figure 3:
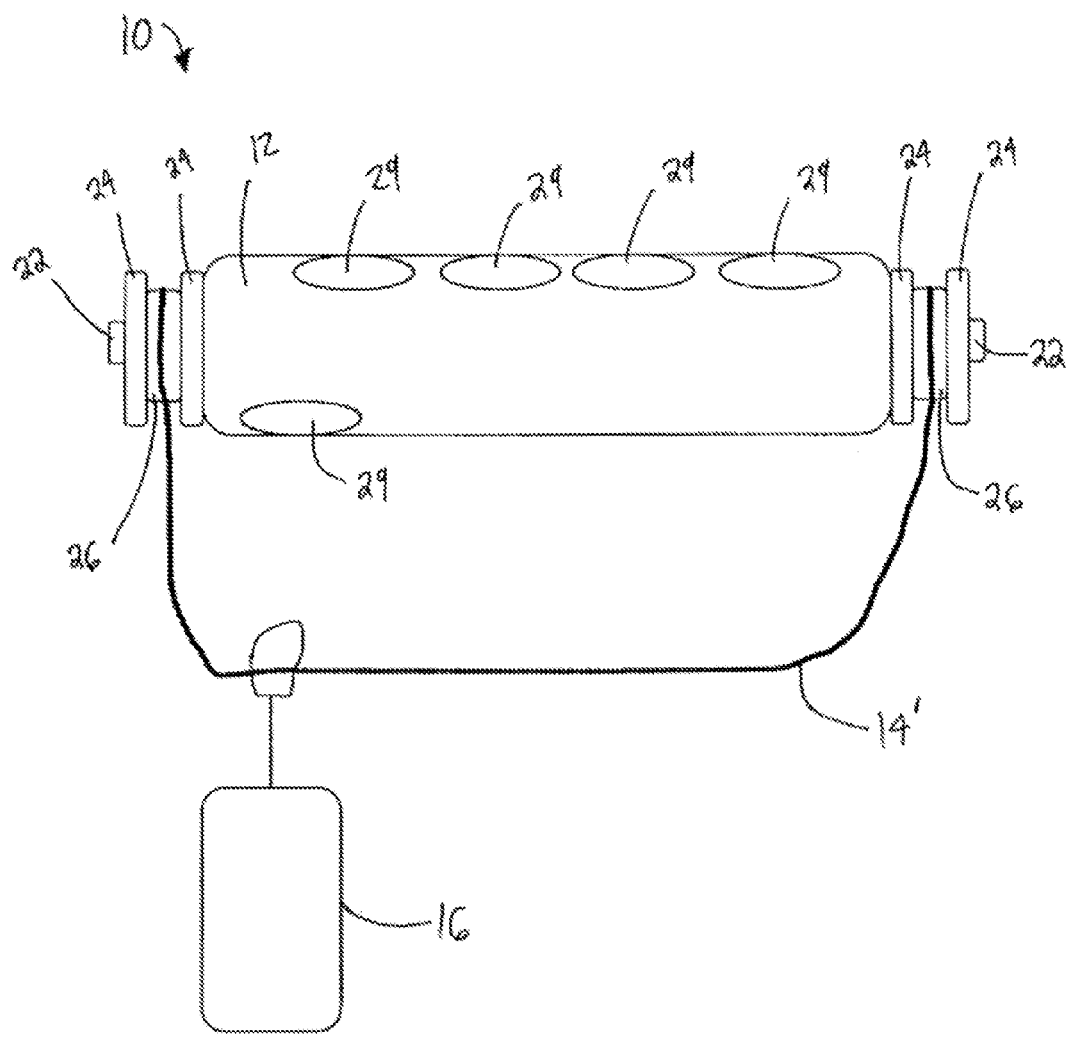
FIG. 3 is a front view of another exemplary fish retaining and transporting assembly according to the present disclosure.

As noted, stringer member 14 can take a variety of other suitable forms. For example and as shown in FIG. 3, stringer member 14' can be an elongated cable-based (e.g., flexible cable or rod-based) stringer member 14' having one or more fish retaining members 16 coupled, secured or mounted with respect to the stringer member 14'. In certain embodiments and as shown in FIG. 3, one or more of the retaining members 16 may be movably coupled or mounted with respect to cable-based stringer member 14' (e.g., so that the movably coupled retaining members 16 can slide or move along the length of cable-based stringer member 14'). Alternatively, one or more of the retaining members 16 may be substantially fixedly coupled to cable-based stringer member 14' (e.g., substantially fixedly coupled to a securing member (clip, loop or fastening member) of stringer member 14'). As noted above and as shown in FIG. 3, handle member 12 may include other features and/or structures such as finger gripping recesses, grooves or structures 29 for the convenience and ease-of-use for the user.

As depicted in FIGS. 1-2, the stringer member 14 is typically mounted with respect to the handle member 12 (e.g., elongated handle member 12). In general, a portion of the stringer member 14 proximal to the first terminal end 17 is mounted with respect to and proximal to the first end 13 of the handle member 12, and a portion of the stringer member 14 proximal to the second terminal end 19 is mounted with respect to and proximal to the second end 15 of the handle member 12.

In exemplary embodiments, the first terminal end 17 of the stringer member 14 is mounted with respect to and proximal to the first end 13 of the handle member 12, and the second terminal end 19 of the stringer member 14 is mounted with respect to and proximal to the second end 15 of the handle member 12. In certain embodiments, the first terminal end 17 of the stringer member 14 is substantially fixedly secured, mounted or attached with respect to and proximal to the first end 13 of the handle member 12, and the second terminal end 19 of the stringer member 14 is fixedly secured, attached or mounted with respect to and proximal to the second end 15 of the handle member 12.

In general, the stringer member 14 can be mounted with respect to the handle member 12 utilizing a variety of fastening/mounting techniques and/or members. In certain embodiments and as shown in FIGS. 1-2, each end 13, 15 of handle member includes a fastening member 22 (e.g., screw member 22 or the like) and a securing member 24 (e.g., washer member 24 or the like), the fastening members 22 and securing members 24 configured and dimensioned to allow a portion of the stringer member 14 proximal to the first terminal end 17 to be mounted with respect to (e.g., fixedly mounted with respect to) and proximal to the first end 13 of the handle member 12, and to allow a portion of the stringer member 14 proximal to the second terminal end 19 to be mounted with respect to (e.g., fixedly mounted with respect to) and proximal to the second end 15 of the handle member 12.

In other embodiments and as shown in FIG. 3, each end 13, 15 of handle member includes a fastening member 22 (e.g., screw member 22 or the like), two securing members 24 (e.g., washer members 24 or the like) and a ferrule member 26 positioned between the two securing members 24. As shown in FIG. 3, the fastening members 22, securing members 24 and ferrule members 26 are configured and dimensioned to allow a portion of the stringer member 14' (e.g., cable-based string member 14', or chain-based string member 14) proximal to the first terminal end 17 to be mounted with respect to the first end 13 of the handle member 12, and to allow a portion of the stringer member 14' (or member 14) proximal to the second terminal end 19 to be mounted with respect to the second end 15 of the handle member 12. As such, such configuration and mounting, securement or attachment of stringer member 14' (or member 14) with respect to handle 12 via fastening members 22, securing members 24 and ferrule members 26 advantageously allows the stringer member 14' (or member 14) and/or handle member 12 to rotate freely relative to one another.

In general, the improved fish retaining/transporting assemblies 10 of the present disclosure make it easier for a user to retain and transport their fish, as the fish retaining/transporting assemblies 10 include a user-friendly handle member 12 (e.g., elongated handle member). For example, the utilization of such a user friendly handle member 12 allows a fisherman to transport the retained fish while the fisherman grasps the handle member 12, and while allowing the fish to stay retained on the stringer member 14 (or 14') and/or retaining devices 16 of the assembly 10. As noted above, such use is highly advantageous when transporting retained fish in difficult conditions, such as, for example: (i) transporting retained fish from a wading fishing location in a body of water (e.g., flowing river, moving tidal water, etc.) to another destination (e.g., to shore, to a cleaning table, boat or camp, etc.) while the user and/or assembly 10 are still in the water by grasping onto the handle member 12 while allowing the fish to stay retained on the stringer member 14 (or 14') and/or retaining devices 16 of the assembly 10, and (ii) transporting retained fish from a fishing location to another location while the user and/or assembly 10 are out of the water and the assembly 10 is lifted above or moved along or proximal to the surface of the ground or water by grasping onto the handle member 12 while allowing the fish to stay retained on the stringer member 14/14' and/or retaining devices 16 of the assembly 10.

Whereas the disclosure has been described principally in connection with fish retaining and transporting devices or assemblies (e.g., fish stringers) for recreational, commercial, industrial and/or domestic purposes, such description has been utilized only for purposes of disclosure and is not intended as limiting the disclosure. To the contrary, it is to be recognized that the disclosed retaining and transporting devices or assemblies are capable of use for other retaining, transporting and/or useful purposes (e.g., for retaining other various items, materials and/or organisms for a variety of purposes/uses, etc.).

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A fish retaining and transporting assembly comprising:
   a handle member extending from a first end to a second end;
   a stringer member extending from a first terminal end to a second terminal end, the first terminal end of the stringer member mounted with respect to the first end of the handle member and the second terminal end of the stringer member mounted with respect to the second end of the handle member; and
   one or more fish retaining members mounted with respect to the stringer member;
   wherein the first and second ends of the handle member each include a fastening member and a securing member, the respective fastening members and securing members configured and dimensioned to allow a portion of the stringer member proximal to the first terminal end to be mounted with respect to the first end of the handle member, and to allow a portion of the stringer member proximal to the second terminal end to be mounted with respect to the second end of the handle member; and
   wherein the fastening members are screw members and the securing members are washers.

2. The fish retaining and transporting assembly of claim 1, wherein the handle member is a substantially cylindrical elongated handle member.

3. The fish retaining and transporting assembly of claim 1, wherein the handle member is fabricated from wood or plastic.

4. The fish retaining and transporting assembly of claim 1, wherein the handle member includes at least one finger gripping recess, groove or structure.

5. The fish retaining and transporting assembly of claim 1, wherein the stringer member is a chain-based stringer member.

6. The fish retaining and transporting assembly of claim 1, wherein the stringer member is a cable-based stringer member.

7. The fish retaining and transporting assembly of claim 1, wherein the one or more fish retaining members are configured and dimensioned to releasably retain fish.

8. The fish retaining and transporting assembly of claim 1, wherein the one or more fish retaining members are substantially fixedly mounted with respect to the stringer member.

9. The fish retaining and transporting assembly of claim 1, wherein the one or more fish retaining members are movably or slidably mounted with respect to the stringer member so that each movably mounted fish retaining member can slide or move along the length of the stringer member.

10. The fish retaining and transporting assembly of claim 1, wherein the first terminal end of the stringer member is substantially fixedly mounted with respect to the first end of the handle member and the second terminal end of the stringer member is substantially fixedly mounted with respect to the second end of the handle member.

11. The fish retaining and transporting assembly of claim 1, wherein the first and second ends of the handle member each include two securing members and a ferrule member positioned between the two securing members.

12. The fish retaining and transporting assembly of claim 11, wherein the configuration and mounting of the stringer member with respect to the handle member via the ferrule members, securing members and fastening members allows the stringer member or handle member to rotate freely relative to one another.

13. A fish retaining and transporting assembly comprising:
   a substantially cylindrical elongated handle member extending from a first end to a second end;
   a stringer member extending from a first terminal end to a second terminal end, the first terminal end of the stringer member mounted with respect to the first end of the substantially cylindrical elongated handle member and the second terminal end of the stringer member mounted with respect to the second end of the substantially cylindrical elongated handle member; and
   one or more fish retaining members mounted with respect to the stringer member;
   wherein the one or more fish retaining members are configured and dimensioned to releasably retain fish; and wherein the first and second ends of the handle member each include a fastening member, two securing members and a ferrule member positioned between the two securing members, the respective fastening members, securing members and ferrule members configured and dimensioned to allow a portion of the stringer member proximal to the first terminal end to be mounted with respect to the first end of the handle member, and to allow a portion of the stringer member proximal to the second terminal end to be mounted with respect to the second end of the handle member.

14. The fish retaining and transporting assembly of claim 13, wherein the configuration and mounting of the stringer member with respect to the handle member via the ferrule members, securing members and fastening members allows the stringer member or handle member to rotate freely relative to one another.

15. The fish retaining and transporting assembly of claim 13, wherein the fastening members are screw members and the securing members are washers.

16. The fish retaining and transporting assembly of claim 13, wherein the stringer member is a chain-based stringer member or a cable-based stringer member.

17. The fish retaining and transporting assembly of claim 13, wherein the handle member includes at least one finger gripping recess, groove or structure.

18. A method for retaining and transporting fish comprising:
providing a handle member extending from a first end to a second end;
providing a stringer member extending from a first terminal end to a second terminal end;
mounting the first terminal end of the stringer member with respect to the first end of the handle member via a first fastening member and a first securing member;
mounting the second terminal end of the stringer member with respect to the second end of the handle member via a second fastening member and a second securing member;
mounting one or more fish retaining members with respect to the stringer member; and
mounting a fish to one of the fish retaining members;
wherein the first and second fastening members are screw members and the first and second securing members are washers.

19. The method of claim 18, wherein the stringer member is a chain-based stringer member or a cable-based stringer member.

20. The method of claim 18, wherein the handle member includes at least one finger gripping recess, groove or structure.

* * * * *